United States Patent [19]

Schneider et al.

[11] 3,882,587
[45] May 13, 1975

[54] METHOD OF PRODUCING A FIBRE-REINFORCED MATERIAL

[75] Inventors: Friedrich Schneider; Dieter Stockel, both of 7530 Pforzheim, Germany

[73] Assignee: G. Rau, Pforzheim, Germany

[22] Filed: Dec. 3, 1973

[21] Appl. No.: 421,281

[30] Foreign Application Priority Data
Dec. 6, 1972  Germany............................ 2259636

[52] U.S. Cl........ 29/419 R; 29/DIG. 11; 29/DIG. 47
[51] Int. Cl.............................................. B23p 17/04
[58] Field of Search............ 29/419, 423, DIG. 11, 29/DIG. 47

[56] References Cited
UNITED STATES PATENTS

| | | | |
|---|---|---|---|
| 2,215,477 | 9/1940 | Pipkin............................... | 29/423 X |
| 3,029,496 | 4/1962 | Levi................................. | 29/DIG. 11 |
| 3,277,564 | 10/1966 | Webber et al..................... | 29/423 X |
| 3,378,999 | 4/1968 | Roberts et al. .................... | 29/419 X |
| 3,394,213 | 7/1968 | Roberts et al. .................... | 29/419 X |
| 3,540,114 | 11/1970 | Roberts et al..................... | 29/419 R |
| 3,643,304 | 2/1972 | Kokubu et al. ................... | 29/423 |
| 3,762,025 | 10/1973 | Gottlieb et al.................... | 29/419 R |
| 3,828,417 | 8/1974 | Divecha............................. | 29/419 |

Primary Examiner—Richard J. Herbst
Assistant Examiner—D. C. Reiley, III
Attorney, Agent, or Firm—Wenderoth, Lind & Ponack

[57] ABSTRACT

A composite fibre-reinforced material is produced by continuously advancing a jacketing material, initially in strip form, and a plurality of sheathed wires so that the wires become enclosed by the jacketing material. The material of the jacket may or may not be the same as that of the sheaths. The wires and jacket are then jointly subjected to plastic deformation and heat treatment so that the wires become fibres and the sheaths become bonded together into a homogeneous matrix material. The exterior surfaces of the jacket material are lubricated to aid passage through the shaping tools.

9 Claims, 1 Drawing Figure

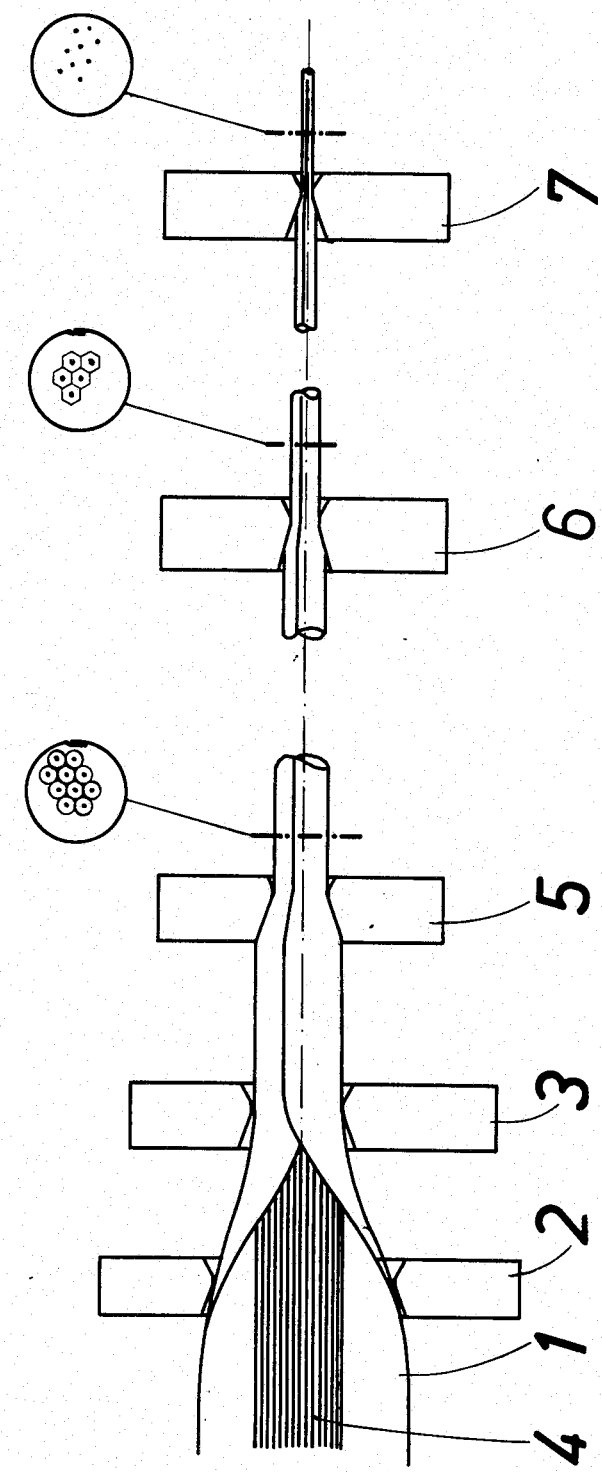

METHOD OF PRODUCING A FIBRE-REINFORCED MATERIAL

BACKGROUND OF THE INVENTION

The invention relates to a method of producing a composite fibre-reinforced material of the type in which a plurality of sheathed wires are encased in a tubular jacket and the jacket and the wires are jointly subjected to plastic deformation to convert the jacketing material and the sheath material into a homogeneous matrix in which the fully shaped parallel fibres are embedded. The tubular jacket may or may not be of the same material as the sheaths.

This method of producing fibre reinforced materials suffers from the disadvantage that the length obtained is limited by the cut length of the tubular jacketing material.

SUMMARY OF THE INVENTION

The present invention seeks to provide a method of production whereby fibre-reinforced materials can be continuously produced in any required length.

In accordance with one aspect of the present invention there is provided a method of producing a composite fibre-reinforced material, such method comprising the steps of continuously advancing a bundle of sheathed wires, encasing the advancing bundle in a jacketing material, subjecting the jacketed bundle to plastic deformation to reduce the diameter thereof whereby to convert the wires to fibres and to bond the sheath material into a homogeneous matrix in which the fibres are embedded, subjecting the jacketed bundle to heat treatment, and continuously applying a lubricant to the exterior surface of the jacketing material while maintaining the interior surface of the jacketing material and the surface of the sheathed wires in a metallic bright condition.

The lubricant for facilitating deformation can be applied in different ways to the exterior surface presented to the shaping tools. For example the lubricant can be applied in an advantageous and simple manner by passing the jacketing material in the form of a strip and prior to its shaping through a suitable lubricant carrier, e.g. a felt or a sponge. Preferably the lubricant carrier is such that the advancing strip is not wetted with lubricant right up to its extreme edges, so that penetration of lubricant into the interior of the subsequently formed jacketing tube is safely prevented. Alternatively, the lubricant may take the form of a coating of a chemical compound applied to the exterior of the tube of jacketing material by cladding, electrodeposition or by vapour-deposition, or it may merely be smeared on to the jacketing material. The use of coatings of plastics materials capable of being drawn by plastic deformation, i.e. the application of a coating of synthetic resin, is preferred. In the case of an electrodeposited coating, a copper coating approximately 10 $\mu$ thick is particularly suitable. Other possibilities are a phosphate coating and the smearing of the jacketing material with molybdenum disulphite, graphite, soaps or equivalent substances. The plastics material known by the registered Trade Mark "Teflon" may in some circumstances also be used with advantage for providing a coating capable of being drawn.

In one embodiment the jacketing material is first advanced in strip form and is then formed into an open-seam tube surrounding the sheathed wires. In another embodiment, the jacketing material may be wound in at least one layer helically around the cluster of sheathed wires to form a casing therefor. Many forms of machine suitable for doing this are known e.g. those used for sheating electric cables.

In accordance a further embodiment of the invention, the material used for the jacketing tube is different from that used for sheathing the wires, and after the plastic deformation, at least part of the jacketing material is removed from the finished composite material. Thus the sheathed wires are encased in a "lost jacketing tube," and the starting material for the jacket must be one which can be readily removed by mechanical, chemical or electrochemical means after a metallic bond between the embedded sheathed wires has been achieved, without the matrix material being attacked. Steel for example is a suitable material for a lost jacketing tube. The jacketing material can be mechanically removed for example by peeling, grinding and the like. The use of a jacketing material that can be subsequently removed results in the production of a fibre reinforced material which exhibits uniform distribution of the fibres even around the periphery of the matrix. The use of a jacket material that is the same as that of the material for sheathing the wires results in a heavy concentration of jacketing material around the periphery where no fibres are present. However, for some purposes it is desirable for the fibres to be uniformly distributed throughout the composite material with a view to obtaining particular mechanical and other physical properties.

In accordance with a second aspect of the invention there is provided a method of producing a composite fibre-reinforced material, such method comprising the steps of encasing a bundle of sheathed wires into a tube of jacketing material, the material of the sheaths being different from that of the tube, subjecting the jacketing material and the sheathed wires to plastic deformation to jointly shape the jacketing material and the sheathed wires whereby the wires are converted into fibres and the sheath material becomes bonded together into a homogeneous matrix in which the fibres are embedded, and then removing at least partially the material of the jacketing tube.

The lost jacketing tube procedure can thus also be advantageously used when the jacketing material takes the form of a cut length of tube into which the sheathed wires are inserted and with which the wires are jointly subjected to plastic deformation.

Where required, a further advantage can be achieved by using a stranded or plaited cluster of sheathed wires instead of wires that are advanced parallel with each other. In this way it is possible to achieve a more favourable disposition of the filaments in the finished material.

In a further embodiment of the invention the fibre reinforced material is first deformed with the tubular jacketing material to obtain the shape of a wire. Several of these wires are then collected into a cluster and subjected to plastic deformation to obtain a further composite fibre reinforced material in the form of a wire.

EXAMPLE

The method will now be described in connection with the production of a silver-nickel filamentary composite material of wire form having a silver content of 80 percent by weight.

The starting material used consisted of 180 sheathed wires each having a diameter of 1 mm, the core of each wire being made of pure nickel and having a diameter of 0.47 mm and the sheath being of fine silver; the weight ratio of these materials was 20 nickel to 80 silver. The jacketing material used was a 52 mm-wide strip of soft sheet-iron having a thickness of 0.4 mm. In a first stage, this sheet-metal strip was converted to an inverted V section. The 180 sheathed wires were wound off bobbins and introduced into this section. To obtain metallically bright surfaces, the wires were cleaned on their way from the bobbins to the device for guiding them into the section. In a second stage, using a die approximately 16 mm in diameter, the section was closed up to the form of a tube, the side edges of the sheet-metal strip overlapping by approximately 2 mm. That face of the strip presented to the tools was lubricated with the aid of a felt which was soaked in lubricant and could be easily pressed against the strip. The sheathed wires were compacted with the jacketing tube in further shaping passes, and the sheathed wires were thereby cold-welded together. Intimate metallic bonding of the sheath materials was brought about by diffusion annealing at approximately 800°C. Thereafter, the post jacketing tube was chemically removed in hydrochloric acid. After removal of the jacketing tube, the fibre-reinforced material was further shaped by the known method and thereby reduced to a diameter of 1 mm. These composite fibre reinforced wires were wound on to bobbins and were again subjected to the abovedescribed cycle of operations in which they themselves are one of 180 fibre-reinforced wires. Thus, 32,400 (180 × 180) nickel filaments were obtained in the finished composite fibre-reinforced wire, the overall diameter of which was 1 mm.

BRIEF DESCRIPTION OF THE DRAWINGS

The steps in the method of manufacture are illustrated diagrammatically by way of example only in the accompanying schematic drawing.

DETAILED DESCRIPTION OF THE INVENTION

The drawing shows the jacketing material 1 which is fed in the form of a strip and which, after passing through a first shaping tool 2, acquires an inverted V cross-section, and is converted into tubular form with overlapping longitudinal edges after having passing through a second shaping tool 3. A plurality of sheathed wires 4 are then inserted into the jacketing tube so formed and are likewise continuously advanced. After the material has passed through a further shaping tool 5 it has acquired the cross-sectional form indicated in the adjacent circle. Various intermediate plastic shaping steps such as drawing and annealing then take place, until, after the material has passed through an additional shaping tool 6, the sheathed wires are in a closely compacted condition. Following diffusion annealing and further intermediate steps and after the material has passed through a final shaping tool 7, a composite fibre-reinforced material in the form of a wire is obtained in which the fibres of the core material of the sheathed wires are embedded in a matrix of sheath material.

By the use of the above-described method, it is possible to produce on a continuous basis a composite fibre-reinforced material in the form of a wire and containing a large number of embedded fibres.

We claim:
1. A method for producing a composite shaped element formed of a homogeneous matrix substance having intimately embedded therein a plurality of reinforcing fibers of a material different from that of said matrix substance and of a material capable of structurally reinforcing said matrix substance, said method consisting essentially of:
  rigidly and metallurgically connecting to each of a plurality of wires of a reinforcing material a sheath of said matrix substance;
  arranging said plurality of thus sheathed wires in a bundle in contact with each other;
  continuously advancing said bundle of sheathed wires in a longitudinal direction;
  encasing the thus advancing bundle of sheathed wires in a jacket of jacketing material;
  continuously applying a lubricant to the exterior surface of said thus advancing jacket while maintaining the interior surface of said jacket and the exterior surfaces of said sheathed wires free of said lubricant and in a metallic bright condition; and
  subjecting said thus lubricated advancing bundle of sheathed wires to a plastic reduction working operation, and thereby reducing the cross-sectional area of said wires to form reinforcing fibers, while mechanically bonding said sheaths into a uniform homogeneous matrix, to thus form said shaped element of homogeneous matrix substance having embedded therein said fibers, and thereby reinforcing said matrix.

2. A method as claimed in claim 1, wherein said step of encasing comprises advancing a strip of said jacketing material with said advancing bundle of sheathed wires, and deforming said strip to form an open-seam tube enclosing said advancing bundle.

3. A method as claimed in claim 2, further comprising applying to the outer surface of said jacket a plastically deformable coating.

4. A method as claimed in claim 1, wherein said step of encasing comprises helically winding around said advancing bundle of sheathed wires at least one layer of said jacketing material.

5. A method as claimed in claim 1, wherein said jacketing material is different from said matrix substance, said method further comprising removing said jacketing material from said shaped element, while avoiding the removal of said matrix substance.

6. A method as claimed in claim 5, further comprising forming a plurality of said shaped elements into a further bundle, and subjecting said thus formed further bundle to a plastic reduction working operation, to thereby form a further reduced shaped element.

7. A method as claimed in claim 1, wherein said step of arranging comprises stranding said sheathed wires into a bundle.

8. A method as claimed in claim 1, wherein said step of arranging comprises plaiting said sheathed wires into a bundle.

9. A method for producing a composite shaped element formed of a homogeneous matrix substance having intimately embedded therein a plurality of reinforcing fibers of a material different from that of said matrix substance and of a material capable of structurally reinforcing said matrix substance, said method consisting essentially of:

rigidly and metallurgically connecting to each of a plurality of wires of a reinforcing material a sheath of said matrix substance;

arranging said plurality of thus sheathed wires in a bundle in contact with each other;

encasing said bundle of sheathed wires in a jacket of jacketing material;

subjecting said thus encased jacketed bundle of sheathed wires to a plastic reduction working operation, and thereby reducing the cross-sectional area of said wires to form reinforcing fibers, while mechanically bonding said sheaths into a uniform homogeneous matrix, to thus form said shaped element of homogeneous matrix substance having embedded therein said fibers, and thereby reinforcing said matrix; and removing said jacketing material from said shaped element, while avoiding the removal of said matrix substance.

* * * * *